United States Patent
Mimura

(10) Patent No.: US 9,436,417 B1
(45) Date of Patent: Sep. 6, 2016

(54) PRINTING SYSTEM CAPABLE OF PRINTING IN ANY ONE OF PLURAL IMAGE FORMING APPARATUSES OVER NETWORK, IMAGE FORMING APPARATUS, AND PRINTING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Shinichi Mimura, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/658,451

(22) Filed: Mar. 16, 2015

(51) Int. Cl.
*G06F 3/12* (2006.01)
*H04N 1/00* (2006.01)

(52) U.S. Cl.
CPC ............ *G06F 3/1227* (2013.01); *G06F 3/126* (2013.01); *G06F 3/1268* (2013.01); *G06F 3/1288* (2013.01); *H04N 1/00209* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| 8,115,954 | B2 | 2/2012 | Tomita | |
|---|---|---|---|---|
| 2001/0038462 | A1* | 11/2001 | Teeuwen | H04N 1/00204 358/1.15 |
| 2007/0013941 | A1* | 1/2007 | Anno | G06F 3/1214 358/1.15 |
| 2010/0073713 | A1* | 3/2010 | Chae | G06F 17/30011 358/1.15 |

* cited by examiner

*Primary Examiner* — Thomas D Lee
(74) *Attorney, Agent, or Firm* — Amin, Turocy & Watson LLP

(57) ABSTRACT

In general, a printing system of an exemplary embodiment includes a client terminal connected via a network, and a plurality of image forming apparatuses each including an operating unit which receives an operation input of a user. A first image forming apparatus that receives a print file from the client terminal transmits metadata of the print file to a second image forming apparatus. The second image forming apparatus displays a list of print files which are on standby for printing based on the metadata, and obtains a print file from the first image forming apparatus when a print instruction and a selection of a desired print file from the list of print files are received through the operating unit, and performs printing based the print file.

7 Claims, 6 Drawing Sheets

PRINTING SYSTEM CAPABLE OF PRINTING IN ANY ONE OF PLURAL IMAGE FORMING APPARATUSES OVER NETWORK, IMAGE FORMING APPARATUS, AND PRINTING METHOD

FIELD

Embodiments described herein relate generally to a printing system capable of printing a print file in any image forming apparatus without using a dedicated server for sharing the print file.

BACKGROUND

There is a printing system capable of printing a print file in any image forming apparatus without using a dedicated server for sharing the print file. In this type of printing system, when the print file is printed in the related art, a client terminal of a user first transmits the print file to all image forming apparatuses over a network. Subsequently, the user goes to any image forming apparatus, selects a print file desired to be printed, and prints the print file in the image forming apparatus.

However, in the printing system of the related art, since the image forming apparatus holds a plurality of print files, a load is applied to the image forming apparatus. In the printing system of the related art, since the client terminal transmits the print file to all of the image forming apparatuses over the network, a load may be applied to the network.

DETAILED DESCRIPTION

In general, a printing system of an exemplary embodiment includes a client terminal connected to the printing system via a network, and a plurality of image forming apparatuses each including an operating unit which receives an operation input of a user. A first image forming apparatus that receives a print file from the client terminal transmits metadata of the print file to a second image forming apparatus. The second image forming apparatus displays a list of print files which are on standby for printing based on the metadata, and obtains a print file from the first image forming apparatus when a print instruction and a selection of a desired print file from the list of print files are received through the operating unit, and performs printing based the print file.

In general, an image forming apparatus of an exemplary embodiment includes an operating unit which receives an operation input of a user, and is connected to a client terminal and another image forming apparatus via a network. When a print file is received from the client terminal, the image forming apparatus transmits metadata of the print file to the other image forming apparatus, and displays a list of print files which are on standby for printing based on the metadata. When a print instruction and a selection of a desired print file are received through the operating unit, the image forming apparatus obtains a print file corresponding to the metadata from the other image forming apparatus which is the transmission source of the metadata, and performs printing based on the print file.

In general, a method of printing a print file of an exemplary embodiment includes transmitting metadata of a print file to another image forming apparatus when the print file is received from a client terminal connected to the image forming apparatus via a network, displaying a list of print files on standby for printing based on the metadata, obtaining a print file corresponding to the metadata from the other image forming apparatus which is the transmission source of the metadata when a print instruction and a selection of a desired print file are received through an operating unit, and performing printing based on the print file.

Hereinafter, an exemplary embodiment will be described with reference to the drawings.

Figure 1:
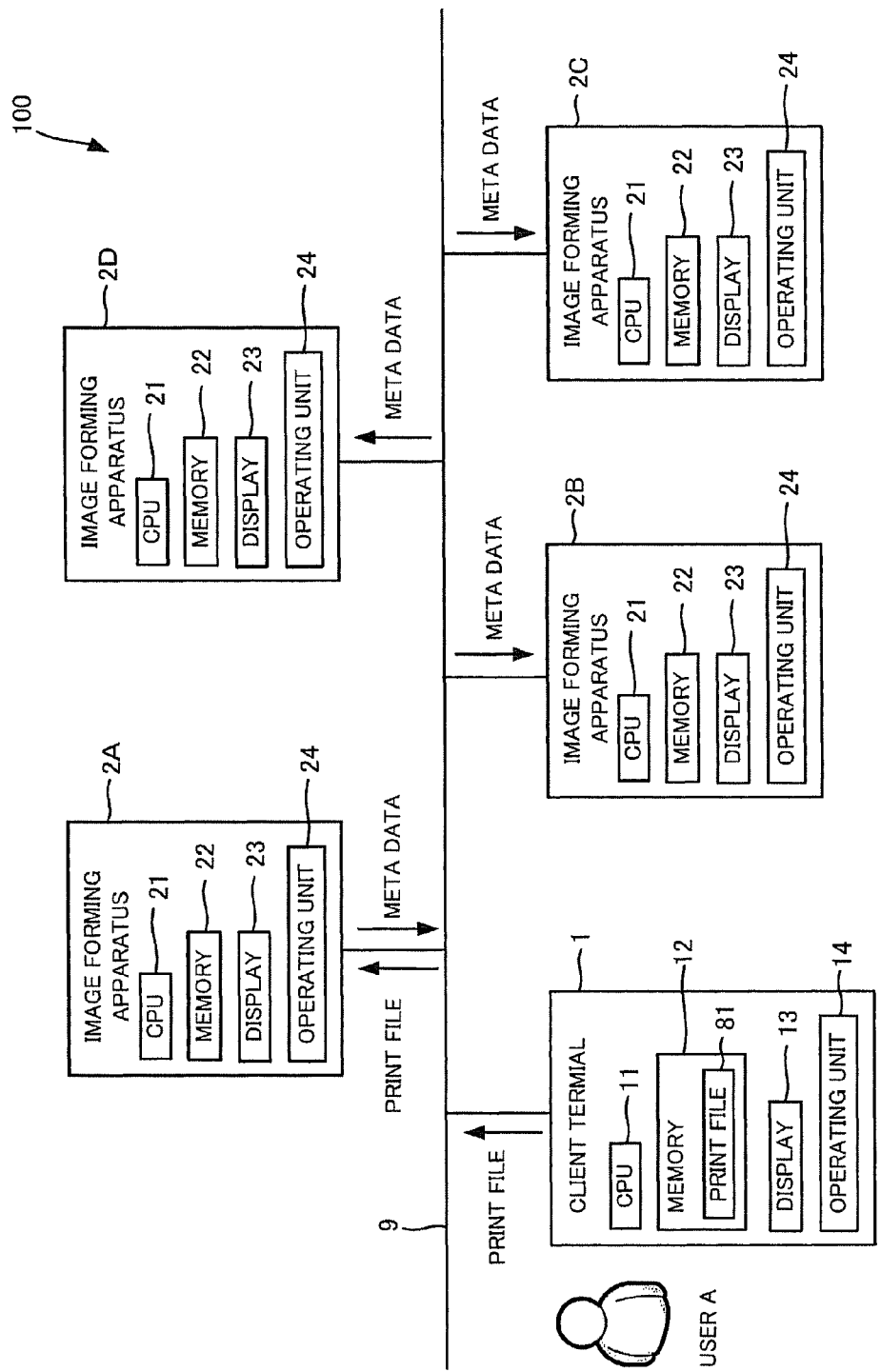
FIG. 1 is a block diagram of a printing system.

FIG. 1 is a block diagram of a printing system 100.

The printing system 100 includes a client terminal 1, and a plurality of image forming apparatuses 2A to 2D. The client terminal 1 and the plurality of image forming apparatuses 2A to 2D are connected so as to communicate with each other via a network 9.

The client terminal 1 is, for example, a personal computer (PC). The client terminal 1 includes a central processing unit (CPU) 11, a memory 12, a display 13, and an operating unit 14. The operating unit 14 is a keyboard, a mouse, or a touch panel, and receives an operation input of a user.

The image forming apparatuses 2A to 2D are, for example, multi-function peripherals (MFPs) having multiple functions such as the capability to print or FAX. Each of the image forming apparatuses 2A to 2D includes a CPU 21, a memory 22, a display 23, and an operating unit 24. The operating unit 24 is a keyboard, a mouse, or a touch panel, and receives an operation input of the user.

The image forming apparatuses 2A to 2D that are co-operated as one group are set to each of the image forming apparatuses 2A to 2D. For example, internet protocol addresses or host names of the image forming apparatuses 2B to 2D that are co-operated are set to the image forming apparatus 2A. Similarly, the image forming apparatuses 2A, 2C, and 2D that are co-operated are set to the image forming apparatus 2B. As stated above, the image forming apparatuses 2A to 2D which are the group are previously set to each of the image forming apparatuses 2A to 2D that are co-operated.

The client terminal 1 and the image forming apparatuses 2A to 2D execute various processes to be described below by reading programs within the memories 12 and 22 using the CPUs 11 and 21.

Firstly, the printing system 100 performs a registration process of registering a print file 81 desired to be printed by a user A in the image forming apparatuses 2A to 2D.

Hereinafter, the registration process performed by the printing system 100 will be described.

The client terminal 1 installs a print driver of the image forming apparatus 2A. When receiving a print operation input by the user A, the client terminal 1 sends the print file 81 to the image forming apparatus 2A through the print driver.

The print file 81 includes image data and metadata 811. The metadata 811 is data for specifying the image data or setting a printing method. The metadata 811 includes the number of copies, the number of pages, a file name, and identification information of the print file 81, and constitutes a job list which is a list of print files. The print file 81 is obtained by converting a file desired to be printed by the user into a page description language (PDL) file with the print driver. The print file 81 may be obtained by converting a file desired to be printed by the user into an extensible markup language (XML) file, an XML paper specification (XPS) file, or a portable document format (PDF) file with the print driver or an application.

Figure 2:
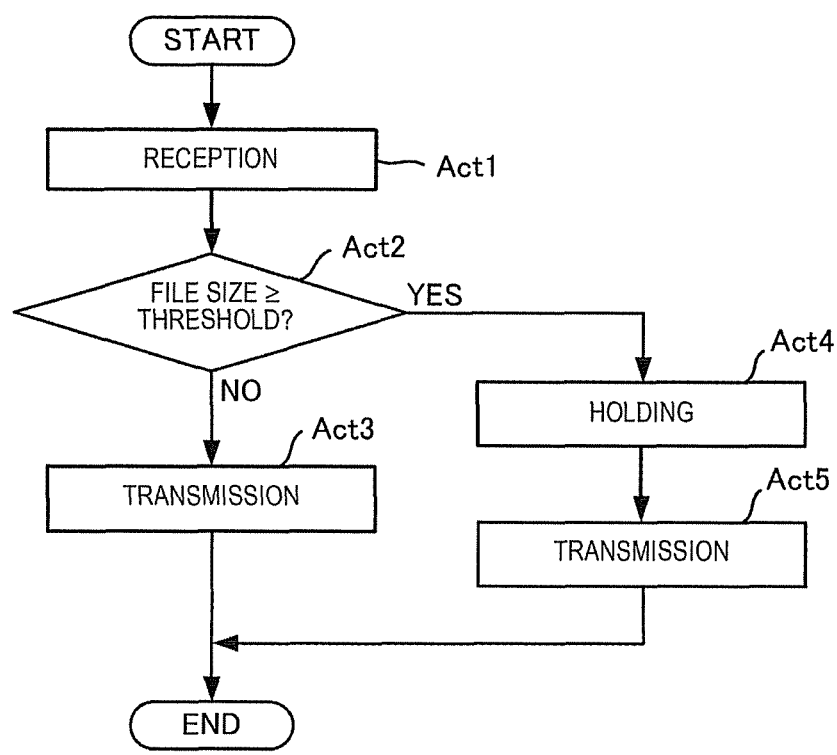
FIG. 2 is a flowchart for describing a registration process performed by the printing system.

Hereinafter, the process performed by the image forming apparatus 2A will be described as the registration process with reference to the flowcharts of FIGS. 1 and 2.

The image forming apparatus 2A receives the print file 81 from the client terminal 1, and stores the print file 81 in a printing standby status in the memory 22 (Act 1).

The image forming apparatus 2A determines whether or not the size of the print file 81 is equal to or greater than a preset threshold (Act 2).

When the size of the print file 81 is less than the threshold (Act 2: NO), the image forming apparatus 2A transmits the print file 81 to the other image forming apparatuses 2B to 2D (Act 3).

When the size of the print file 81 is equal to or greater than the threshold (Act 2: YES), the image forming apparatus 2A holds the print file 81 (Act 4).

The image forming apparatus 2A transmits the metadata 811 of the print file 81 to the other image forming apparatuses 2B to 2D (Act 5). The metadata 811 includes identification information of the image forming apparatus 2A which is the transmission source of the metadata 811. The other image forming apparatuses 2B to 2D add the print file 81 on standby for printing to job lists, respectively. As mentioned above, the client terminal 1 and the image forming apparatuses 2A to 2D synchronize the job lists with each other.

A printing process performed by the printing system 100 after the above-mentioned registration process will be described below. In the following description, it is assumed that the size of the print file 81 desired to be printed by the user is equal to or greater than the threshold. It is assumed that the print file 81 is held in the image forming apparatus 2A. It is assumed that only the metadata 811 of the print file 81 is transmitted to the other image forming apparatuses 2B to 2D.

Figure 3:
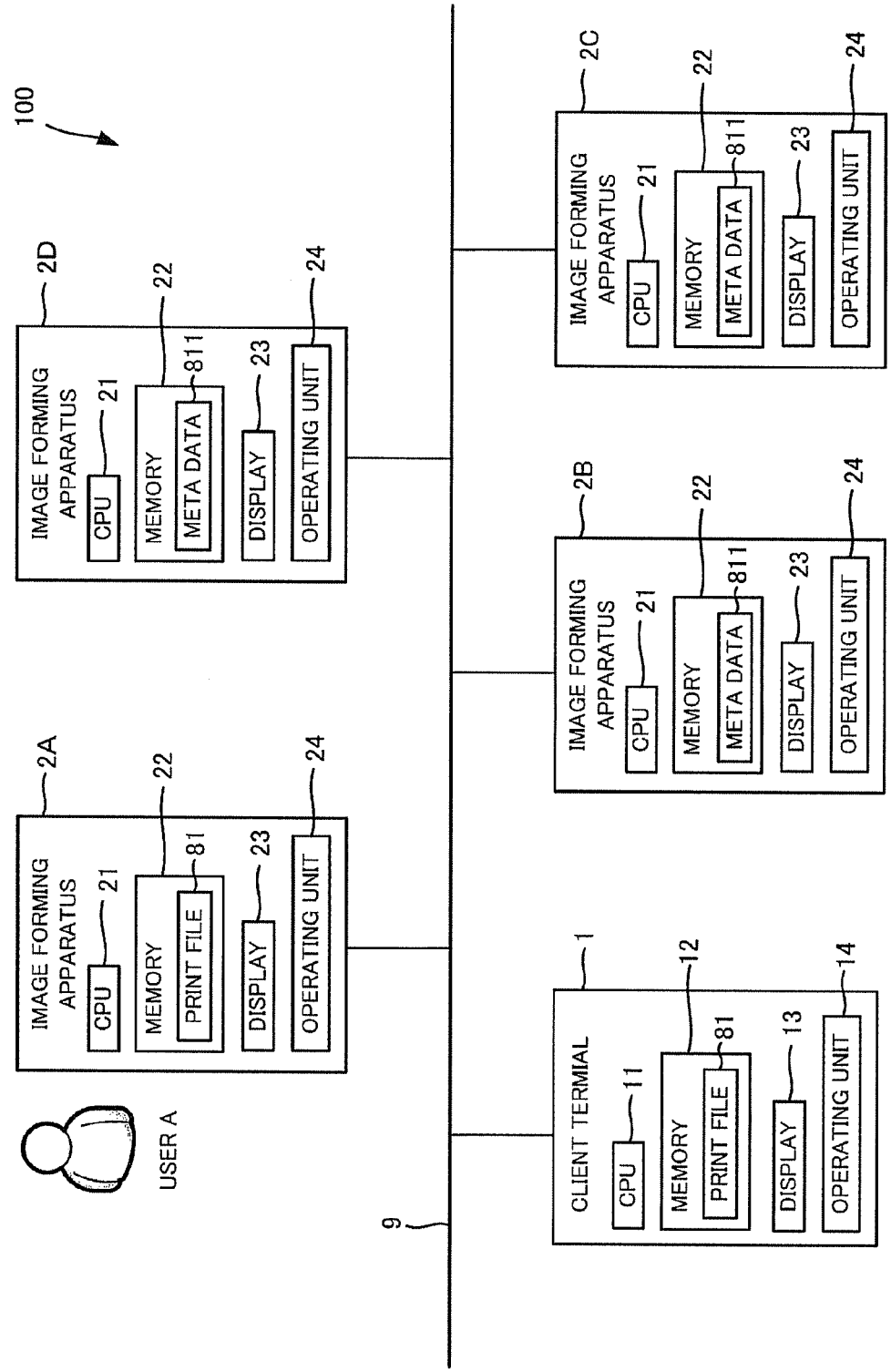
FIG. 3 is a block diagram for describing a printing process performed by the printing system when printing is performed in an image forming apparatus that holds a print file.
Figure 4:
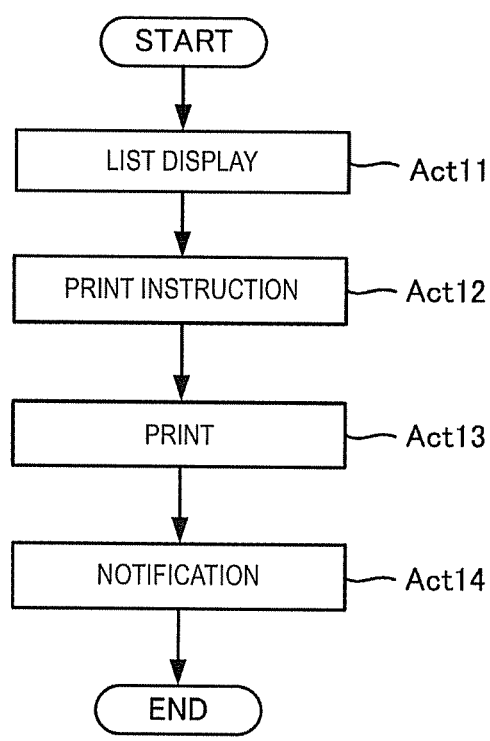
FIG. 4 is a flowchart for describing a printing process performed by the printing system when the printing is performed in the image forming apparatus that holds the print file.

Firstly, a printing process performed by the printing system 100 when the user A performs printing in the image forming apparatus 2A that holds the print file 81 will be described with reference to FIGS. 3 and 4. The flowchart of FIG. 4 shows a flow of the process performed by the image forming apparatus 2A.

The user A goes to the image forming apparatus 2A, and operates the operating unit 24 to allow the image forming apparatus 2A to display the job list (Act 11).

In this example, the user A selects the print file 81 from the job list, and instructs the printing of the print file 81 (Act 12). The image forming apparatus 2A prints the print file 81 (Act 13). The image forming apparatus 2A notifies the client terminal 1 and the other image forming apparatuses 2B to 2D that the print file 81 is printed. The image forming apparatus 2A changes the status of the printed print file 81 to a print completion status from a print standby status, and removes the print file 81 (Act 14). The client terminal 1 and the other image forming apparatuses 2B to 2D change the status of the printed print file 81 to the print completion status, and synchronize the job lists with the job list of the image forming apparatus 2A.

Figure 5:
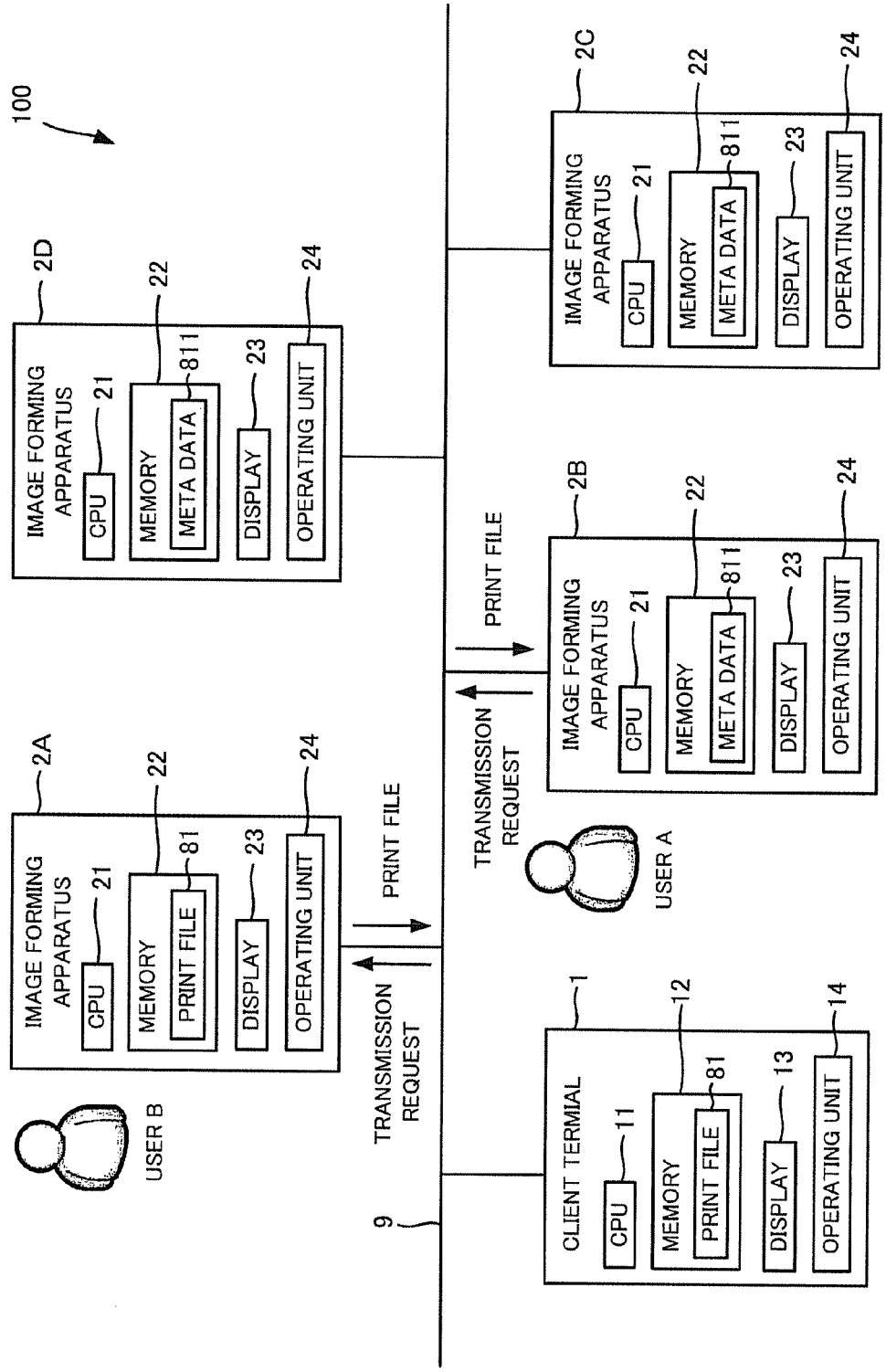
FIG. 5 is a flowchart for describing a printing process performed by the printing system when a print file having only metadata is printed in the image forming apparatus.
Figure 6:
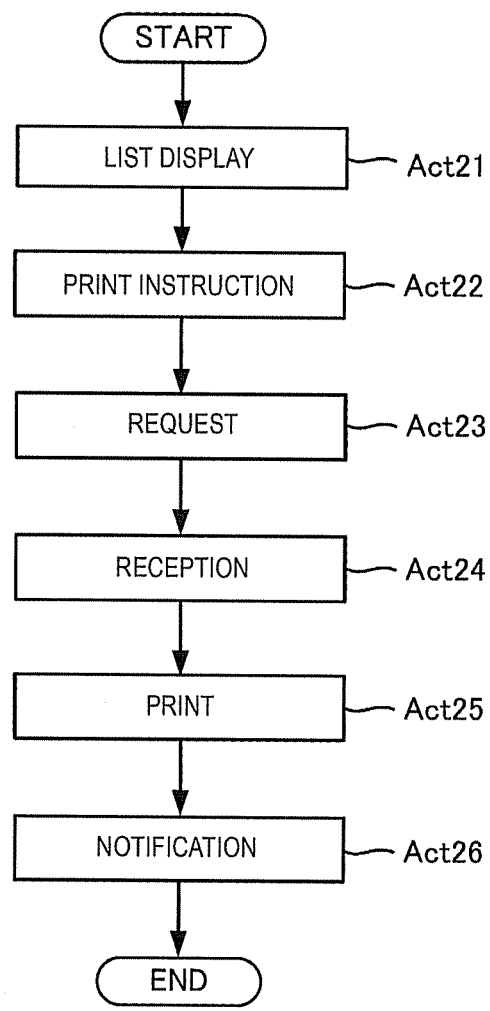
FIG. 6 is a block diagram for describing the printing process performed by the printing system when the print file having only the metadata is printed in the image forming apparatus.

Next, a printing process performed by the printing system 100 when the user A prints the print file 81 in the image forming apparatus 2B will be described with reference to FIGS. 5 and 6. In this example, although the user A plans the printing in the image forming apparatus 2A, and sends the print file 81 to the image forming apparatus 2A, it is considered that another user B uses the image forming apparatus 2A. The flowchart of FIG. 6 shows a flow of the process performed by the image forming apparatus 2B.

The user A goes to the image forming apparatus 2B, and operates the operating unit 24 to allow the image forming apparatus 2B to display the job list showing that the status of the print file 81 is on standby for printing (Act 21). The user A selects the print file 81 having only the metadata 811 in the image forming apparatus 2B, and instructs the printing of the print file 81 (Act 22).

The image forming apparatus 2B transmits a transmission request of the print file 81 to the image forming apparatus 2A which is the transmission source of the metadata 811 (Act 23).

The image forming apparatus 2B receives the print file 81 from the image forming apparatus 2A (Act 24). In this case, the image forming apparatus 2A removes the print file 81.

The image forming apparatus 2B prints the print file 81 (Act 25).

The image forming apparatus 2B notifies the client terminal 1 and the other image forming apparatuses 2A, 2C and 2D that the print file 81 is printed. The image forming apparatus 2B changes the status of the printed print file 81 to the print completion status, and removes the print file 81 (Act 26). The client terminal 1 and the other image forming apparatuses 2A, 2C and 2D change the status of the printed print file 81 to the print completion status, and synchronize the job lists with the job list of the image forming apparatus 2B.

In the present exemplary embodiment, although it is stated that the user A transmits the print file 81 to the image forming apparatus 2A, it is possible to perform the same operation even when the print file 81 is transmitted to any one of the other image forming apparatuses 2B to 2D constituting the group.

The user may log on to the printing system 100 in the client terminal 1 and the image forming apparatuses 2A to 2D, and may operate the respective apparatuses 1 and 2A to 2D. The respective apparatuses 1 and 2A to 2D may create the job lists for the respective users, and may synchronize the job lists of the respective users.

As described above, according to the exemplary embodiment described in the present specification, it is possible to provide a printing system capable of printing a print file in any one of image forming apparatuses without using a dedicated server for sharing the print file.

What is claimed is:
1. A printing system comprising:
 a client terminal that is connected to the printing system via a network; and a plurality of image forming apparatuses each including an operating unit which receives an operation input of a user, wherein a first image forming apparatus that receives a print file from the client terminal transmits metadata of the print file to a second image forming apparatus, and the second image forming apparatus displays a list of print files which are on standby for printing based on the metadata, obtains the print file from the first image forming apparatus when a print instruction and a selection of a desired print file are received through the operating unit, and performs printing based on the print file, wherein the first image forming apparatus transmits the print file to the second image forming apparatus when a print file having a size less than a threshold is received.

2. The system according to claim 1, wherein the first image forming apparatus holds the print file until the first image forming apparatus or the second image forming apparatus perform the printing based on the print file when a print file having a size equal to or greater than the threshold is received.

3. The system according to claim 1, wherein the print file includes image data and metadata, and the metadata is data for specifying the image data and data for setting a method of printing the image data.

4. An image forming apparatus that includes an operating unit that receives an operation input of a user, and is connected to a client terminal and another image forming apparatus via a network, wherein when a print file is received from the client terminal, the image forming apparatus transmits metadata of the print file to the other image forming apparatus, and the image forming apparatus displays a list of print files which are on standby for printing based on the metadata, obtains a print file corresponding to the metadata from the other image forming apparatus which is a transmission source of the metadata when a print instruction and a selection of a desired print file are received, and performs printing based on the print file, wherein when a print file having a size less than a threshold is received, the image forming apparatus transmits the print file to the other image forming apparatus.

5. The apparatus according to claim 4, wherein when a print file having a size equal to or greater than a threshold is received, the image forming apparatus holds the print file until the image forming apparatus or the other image forming apparatus performs the printing based on the print file.

6. A method of printing a print file, the method comprising:

transmitting metadata of a print file to another image forming apparatus when the print file is received from a client terminal connected to the image forming apparatus via a network;

displaying a list of print files which are on standby for printing based on the metadata;

obtaining a print file corresponding to the metadata from the other image forming apparatus which is the transmission source of the metadata when a print instruction and a selection of a desired print file are received through an operating unit; and performing printing based on the print file, wherein when a print file having a size less than a threshold is received, the print file is transmitted to the other image forming apparatus.

7. The method according to claim 6, wherein when a print file having a size equal to or greater than the threshold is received, the print file is held until the image forming apparatus or the other image forming apparatus performs the printing based on the print file.

* * * * *